US011941326B2

(12) United States Patent
Jalla

(10) Patent No.: US 11,941,326 B2
(45) Date of Patent: Mar. 26, 2024

(54) ANALYSIS AND DESIGN SOFTWARE FOR MAT-FOUNDATION

(71) Applicant: Consulting Engineers, Corp., Reston, VA (US)

(72) Inventor: Maharaj Jalla, Great Falls, VA (US)

(\*) Notice: Subject to any disclaimer, the term of this patent is extended or adjusted under 35 U.S.C. 154(b) by 563 days.

(21) Appl. No.: 17/067,034

(22) Filed: Oct. 9, 2020

(65) Prior Publication Data
US 2022/0114290 A1    Apr. 14, 2022

(51) Int. Cl.
*G06F 30/13* (2020.01)
*G06F 30/20* (2020.01)
*G06F 119/02* (2020.01)

(52) U.S. Cl.
CPC .............. *G06F 30/13* (2020.01); *G06F 30/20* (2020.01); *G06F 2119/02* (2020.01)

(58) Field of Classification Search
CPC .......... G06F 30/00; G06F 30/13; G06F 30/20; G06F 2119/02
USPC ............................................................ 703/1
See application file for complete search history.

(56) References Cited

U.S. PATENT DOCUMENTS 6,412,243 B1 \* 7/2002 Sutelan ................... E04B 7/102
52/783.17

OTHER PUBLICATIONS

Partazian, Pouya, "Finite Element-Based Parametric Analysis of Mat Foundations", Apr. 2016, Thesis, American University of Sharjah, College of Engineering. (Year: 2016).\*
Mangal, Mohit et al., Automated Optimization of Steel Reinforcement in RC Building Frames using Building Information Modeling and Hybrid Genetic Algorithm:, Feb. 18, 2018, Automation in Construction 90, Elsevier, B.V. (Year: 2018).\*

\* cited by examiner

*Primary Examiner* — Cedric Johnson
(74) *Attorney, Agent, or Firm* — Andrew Morabito

(57) ABSTRACT

The present invention is a computer-implemented method for constructing the foundation of a building, comprising; receiving nodal data associated with the structure design; propagate, member data of the structural frame; analyzing, the member data of the structural frame and the nodal data; applying, a series of loads to the structural frame; generating, a deflection model of the structural frame; and determining, by one of more processors, if any of the members failed and determining the strengthening requirements for the failed members.

19 Claims, 15 Drawing Sheets

ANALYSIS AND DESIGN SOFTWARE FOR MAT-FOUNDATION

BACKGROUND

This disclosure relates generally to building analysis and in particular, to the method, computer program, or computer system for providing the analysis and design with quality control of the material for the building construction.

The present invention relates to a wall foundation system for residential houses that eliminates the need to construct a whole concrete floor deck. Generally, for transferring the load from wall to soil, a mat foundation is used in which a concrete mat foundation with uniform thickness is laid down, and at the location where loading is higher, its depth is increased. In another method, the isolated footing is provided at each loading point.

In the existing practice for construction of the concrete foundation for walls, the whole bed of concrete is constructed at the site as per plan, but it requires a large quantity of concrete. For this purpose, whole soil at the site is excavated and after the foundation is laid down. It requires a greater number of laborers as well as material quantity.

Due to this type of construction process, there is a chance of getting differential settlement at various locations on the same site if all the footing is not connected. We know that how beams are interconnected with each other so that the bending moment coming on it due to loading, is distributed over the entire span equally, and thus overall settlement decreases. The same technique is used for the footing of walls.

In the current analysis and design software, if any condition occurs, like at some site location there is no enough strength to soil or due to heavy water or water table there are chances of soil washout, so we have to design this part separately to get stable. Again, the load does not get distributed over other spans as they are not interconnected.

Thus the primary object of the present invention is to provide an alternative foundation system for wall based on a more practical procedure for design, analyzing, planning, and constructing upright, poured concrete foundation walls, which is sound from an engineering point of view, economical and time-efficient. This foundation system eliminates large excavations and allows the backfilling of the soil before the construction of the first-floor deck.

SUMMARY

In a first embodiment, the present invention is a computer-implemented method for constructing the foundation of a building, comprising: receiving nodal data associated with the structure design; propagate, by one or more processors, member data of the structural frame; analyzing, by one or more processors, the member data of the structural frame and the nodal data; applying, by one or more processors, a series of loads to the structural frame; generating, by one or more processors, a deflection model of the structural frame; and determining, by one of more processors, if any of the members failed and determining the strengthening requirements for the failed members.

In a second embodiment, the present invention is a computer program product for designing a building foundation, the computer program product comprising a computer non-transitory readable storage medium having program instructions embodied therewith, the program instructions executable by a computing device to cause the computing device to: program instructions to receive data associated with the structure; program instructions to propagate a foundation design based on the structure, wherein the foundation is comprised of a footing and members; program instructions to analyze the members and the footing design; program instructions to apply a series of loads to the foundation based on the structure design; program instructions to generate a deflection model of the structural frame; and program instructions to identify failing members.

In a third embodiment, the present invention is a system for designing a building foundation comprising: a CPU, a computer readable memory and a computer non-transitory readable storage medium associated with a computing device; program instructions to receive data associated with a structure; program instructions to propagate a foundation design based on the structure, wherein the foundation is comprised of a footing and members; program instructions to analyze the members and the footing design; program instructions to apply a series of loads to the foundation based on the structure design; program instructions to generate a deflection model of the structural frame; and program instructions to identify failing members.

BRIEF DESCRIPTION OF THE DRAWINGS

The present invention will be more readily understood by reference to the following description when read in conjunction with the attached drawings.

DETAILED DESCRIPTION

The present invention generally relates to the process of design and analysis of a building to identify member properties and getting its design for the loading coming on it before construction. Typically building has different components like footing, floor bed, studs or columns, floor beams or floor joists, walls, trusses. All these components need a specified design for carrying the load versus their capacity so that the whole building will remain stable in the future.

Figure 1:
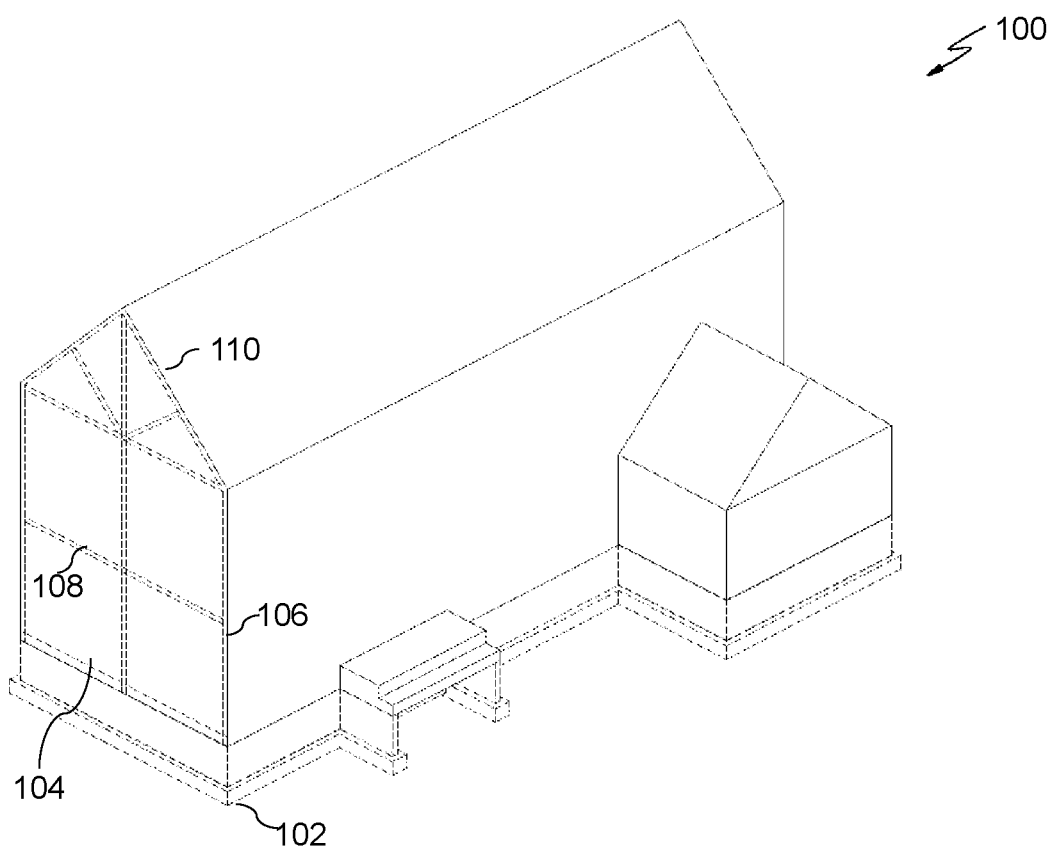
FIG. 1 depicts an isometric view of a building, in accordance with one embodiment of the present invention.
Figure 2:
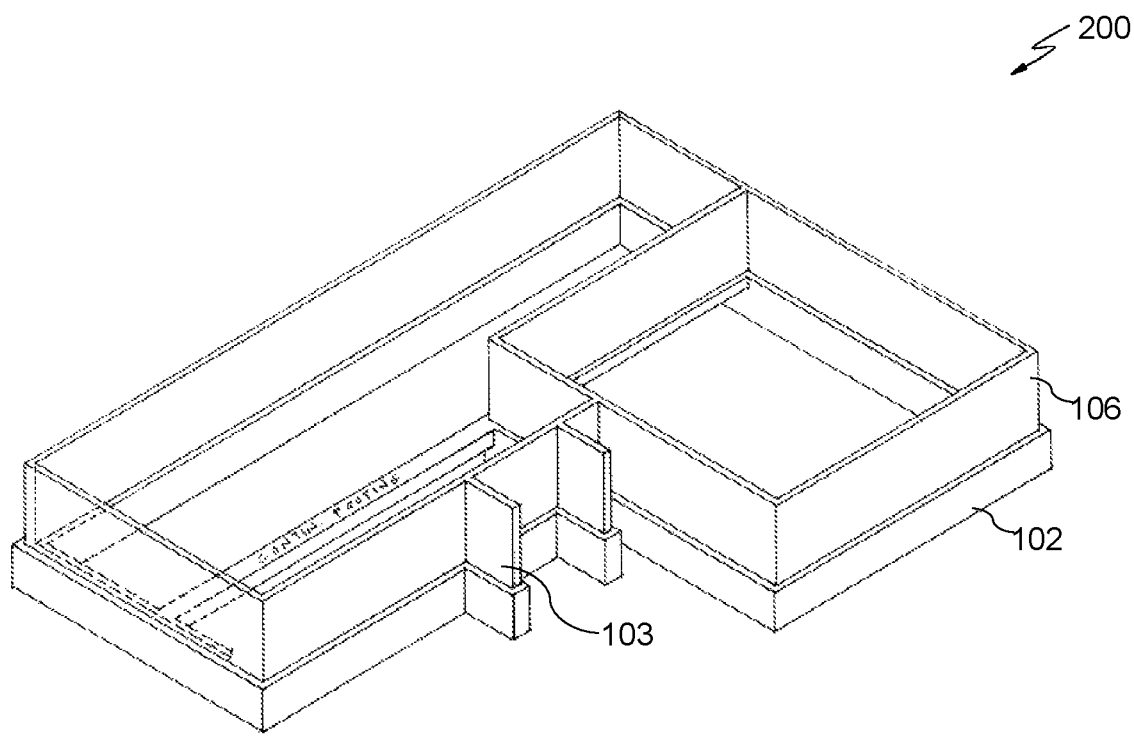
FIG. 2 depicts an isometric view of a building foundation, in accordance with one embodiment of the present invention.
Figure 13:
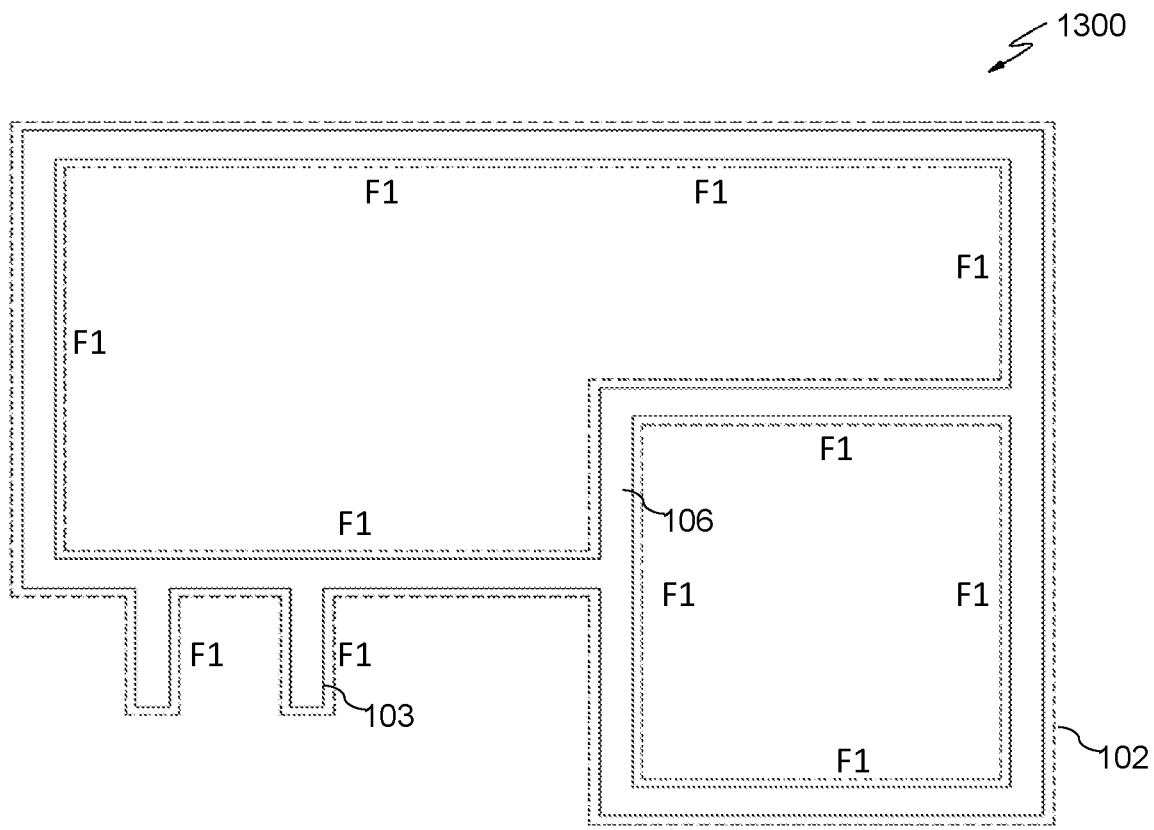
FIG. 13 depicts a top view of a foundation, in accordance with one embodiment of the present invention.

In FIG. 1 which shows an isometric view of a building 100 with various frame and structure members visible. The footing 102, floor bed 104, vertical framing members 106, floor joists 108, roof truss 110 are shown, the building may have additional members or features which could be included in the model. FIG. 2 shows an isometric view of the foundation 200 in which the footing 102 is shown with the foundation walls 106 present as well. In the depicted embodiment, lateral stiffeners 103 are integrated into the foundation walls 106 and footing 102. The lateral stiffeners 103 provide for additional strength to the footing and foundation walls. FIG. 13 shows a top view of the foundation 1300 with the foundation wall 106 as a unitary design, with the footing 102 shown extending beyond the foundation wall 106 thickness. The lateral stiffeners 103 are also integrated into the foundation wall 106.

Figure 3:
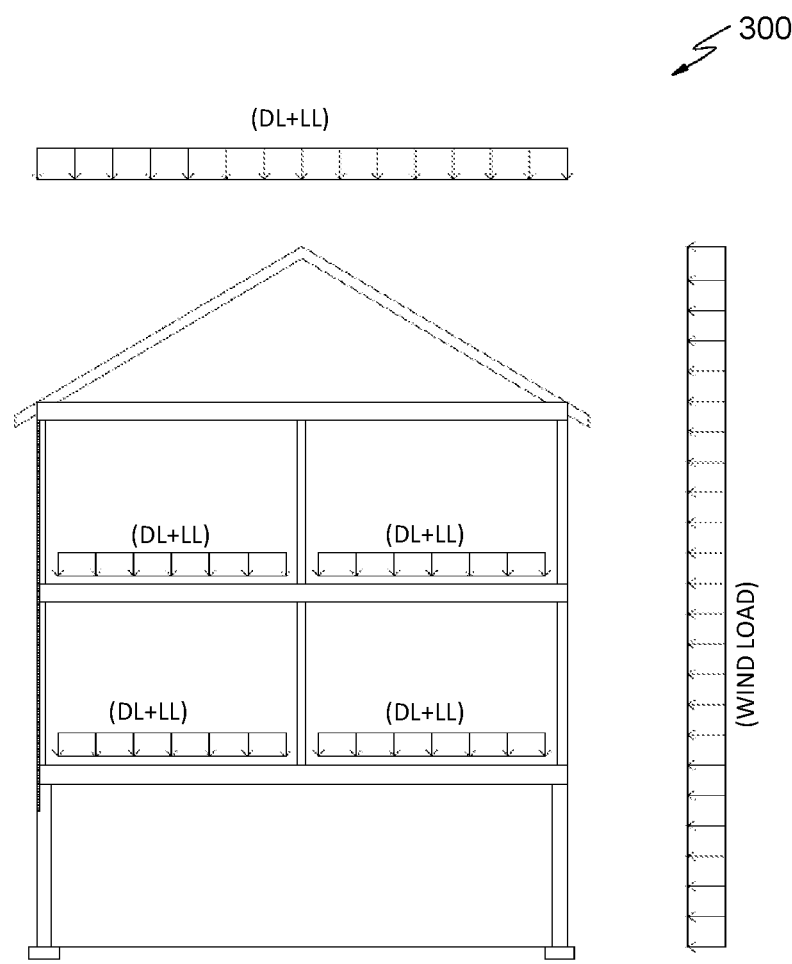
FIG. 3 depicts a flow of load transfer through various members of the building, in accordance with one embodiment of the present invention.
Figure 4:
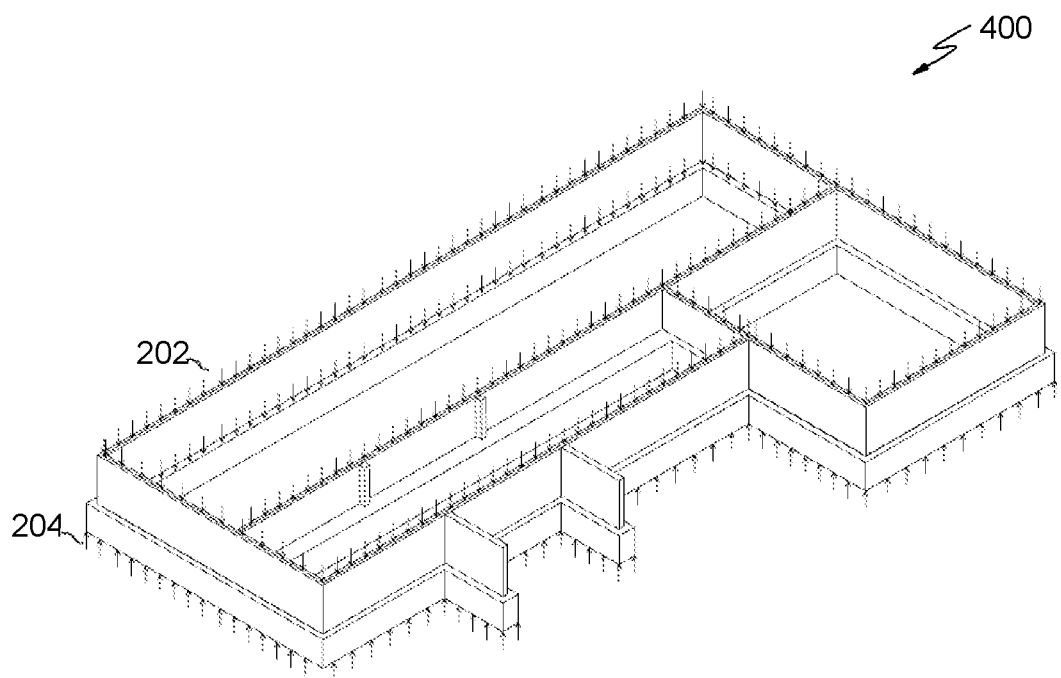
FIG. 4 depicts a flow of load transfer through the foundation, in accordance with one embodiment of the present invention.

Generally, the footing is constructed with a whole concrete bed firstly, after that wall is erected on it and then the second floor in sequential order. Thus, each element needs to have the capacity to carry the load (LL) as well as self-weight (DL) and additional loads or forces acting on the building (WIND LOAD). FIG. 3 shows a building 300 with a load path in the building of the load applied overall, and on each floor. This diagram shows how the load is transferred to the soil through elements. The load coming on roof truss is transferred to the wall of the second floor, then load from the second floor with roof truss load is transferred to lower floor walls and finally, all the loads 202 from all floors is transferred to the soil through the footing of the walls in the foundation as shown in FIG. 4. As the load 202 is acting on soil through the structure above, the soil will also apply reverse reaction 204 to the footing equal to the load coming on it.

Figure 5:
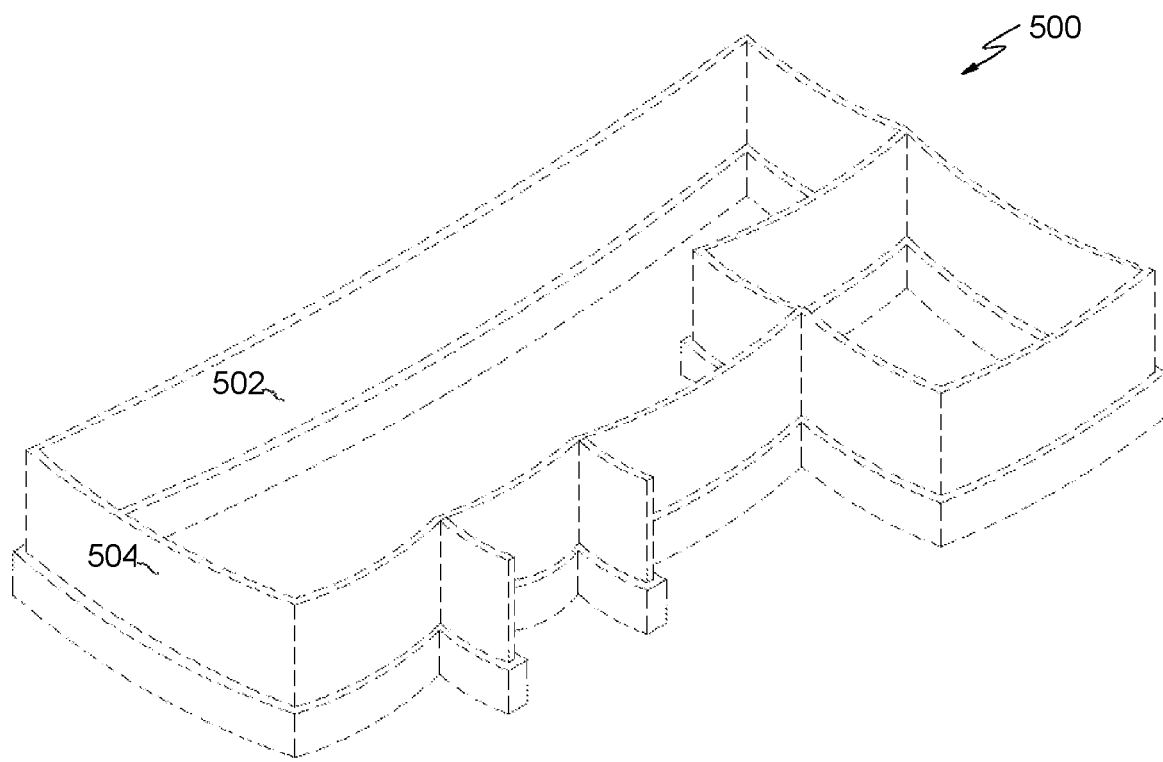
FIG. 5 depicts a deflected shape of the foundation due to load, in accordance with one embodiment of the present invention.

Due to this loading bending of the slab as well as the footing is occurred. But as per design code provisions, it should be in limit. FIG. 5 shows a deflected shape 502 and 504 of the footing 500 for illustrative purposes. In some embodiments, this is an exaggerated deflection model to highlight the areas were the deflection is unsafe. This deflection model may be color coated to further illustration the areas of greater (or less) deflection. The differential settlement of the footing should be in limit. If individual footing is integrated into each wall, there may be chances of differential settlement, so interconnection between them is needed to minimize this effect. In another case the footings are not connected due to which differential settlement occurs, chances of causing instability to structure.

The present invention provides an alternative procedure. In this procedure, a trench footing is provided to each wall in which the trench footing is of inverted "T" shaped. Also, for internal walls, all the nodes are connected with beam or trench footing. The result of this is a complete framed structure capable of carrying the load and distributing the load uniformly through the span. Also, this type of footing eliminates extra excavation of soil as we are directly providing the footing exactly below the wall, thus load will transfer exactly at the center without eccentricity. This is the simplest form of footing which is constructed in less time and less material as it eliminates the whole concrete thick bed which is constructed generally. If the soil data and material data is known, then from an engineering point of view, its analysis and design are easy as this footing is acting as a beam. Also, its construction is simple to execute.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or mechanical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, fir joists, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein about flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployments, models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, deployed applications, and possibly limited control of select networking components (e.g., host fir joists).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes.

Figure 6:
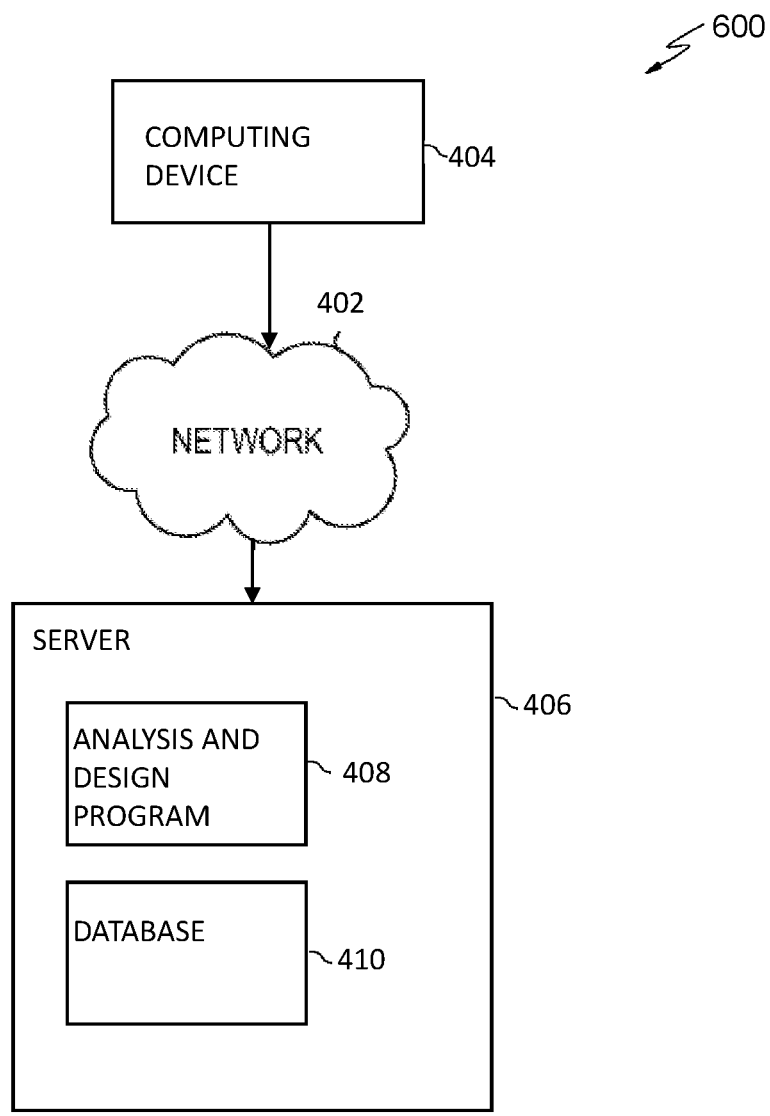
FIG. 6 depicts a block diagram depicting a computing environment, in accordance with one embodiment of the present invention.

FIG. 6 depicts a block diagram of a computing environment 600 in accordance with one embodiment of the present invention. FIG. 6 illustrates one embodiment and does not imply any limitations regarding the environment in which different embodiments may be implemented.

In the depicted embodiment, the computing environment 600 includes network 402, computing device 404, and server 406. Computing environment 100 may include additional servers, computers, or other devices not shown.

Network 402 may be a local area network (LAN), a wide area network (WAN) such as the Internet, any combination thereof, or any combination of connections and protocols that can support communications between computing device 104 and server 106 in accordance with embodiments of the invention. Network 402 may include wired, wireless, or fiber optic connections.

Computing device 404 may be a management server, a web server, or any other electronic device or computing system capable of processing program instructions and receiving and sending data. In other embodiments, computing device 404 may be a laptop computer, tablet computer, netbook computer, personal computer (PC), a desktop computer, or any programmable electronic device capable of communicating with patient computing device 404 via network 402. In other embodiments, computing device 404 may be a server computing system utilizing multiple computers as a server system, such as in a cloud computing environment. In one embodiment, computing device 404 represents a computing system utilizing clustered computers and components to act as a single pool of seamless resources. Computing device 404 may include components, as depicted and described in further detail with respect to FIG. 6.

Server 406 may be a management server, a web server, or any other electronic device or computing system capable of processing program instructions and receiving and sending data. In other embodiments server, 406 may be a laptop computer, tablet computer, notebook computer, personal computer (PC), a desktop computer, or any programmable electronic device capable of communicating via network 402. In one embodiment, server 406 may be a server computing system utilizing multiple computers as a server system, such as in a cloud computing environment. In one embodiment, server 406 represents a computing system utilizing clustered computers and components to act as a single pool of seamless resources. In the depicted embodiment conflict identification program 408 and database 410 are located on server 406. Server 406 may include components, as depicted and described in further detail with respect to FIG. 6.

The analysis and design program 408 generate the footing design based on the structure model and the model related data. The analysis and design program 408 are able to perform the analysis on the model/footing to calculate failures and over designs so that the foundation can be designed to provide maximum strength and minimum resources. In the depicted embodiment, Analysis and Design program 408 utilize network 402 to access the computing device 104 and to communicate with database 410. In one embodiment, Analysis and Design program 408 reside on computing device 404. In other embodiments, Analysis and Design program 408 may be located on another server or computing device, provided Analysis and Design program 408 has access to database 410.

Database 410 may be a repository that may be written to and/or read by Analysis and Design program 408. Information gathered from computing device 404 and the requirements so that the materials and members are identified as failed or not failed. In one embodiment, database 410 is a database management system (DBMS) used to allow the definition, creation, querying, update, and administration of a database(s). In the depicted embodiment, database 410 resides on computing device 404. In other embodiments, database 410 resides on another server, or another computing device, provided that database 410 is accessible to Conflict identification program 408.

Figure 7:
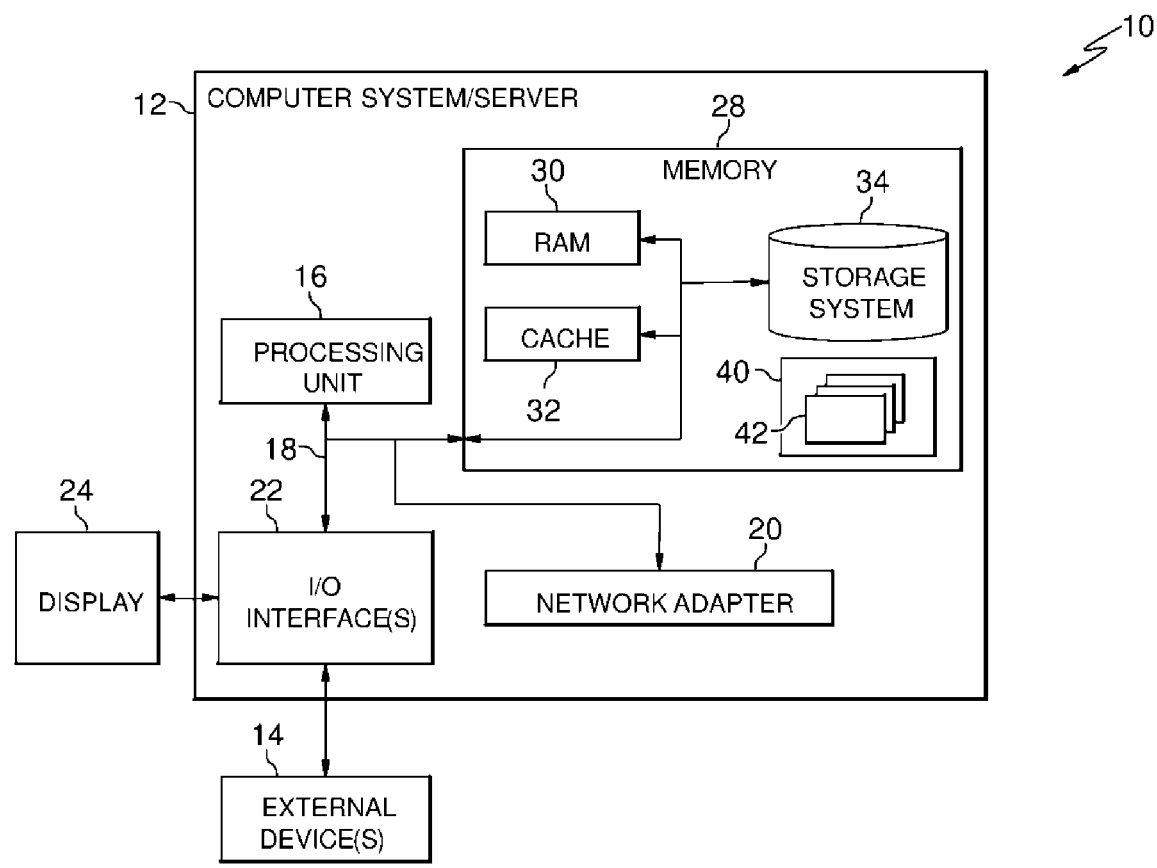
FIG. 7 depicts a block diagram depicting the internal and external components of the server and computing device of FIG. 6, in accordance with one embodiment of the present.

FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

FIG. 7, computer system/server in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still, yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include but are not limited to: microcode, device drivers, redundant processing units, and external disk drive arrays, RAID systems, tape drives, and data archival storage systems, etc.

Figure 8:
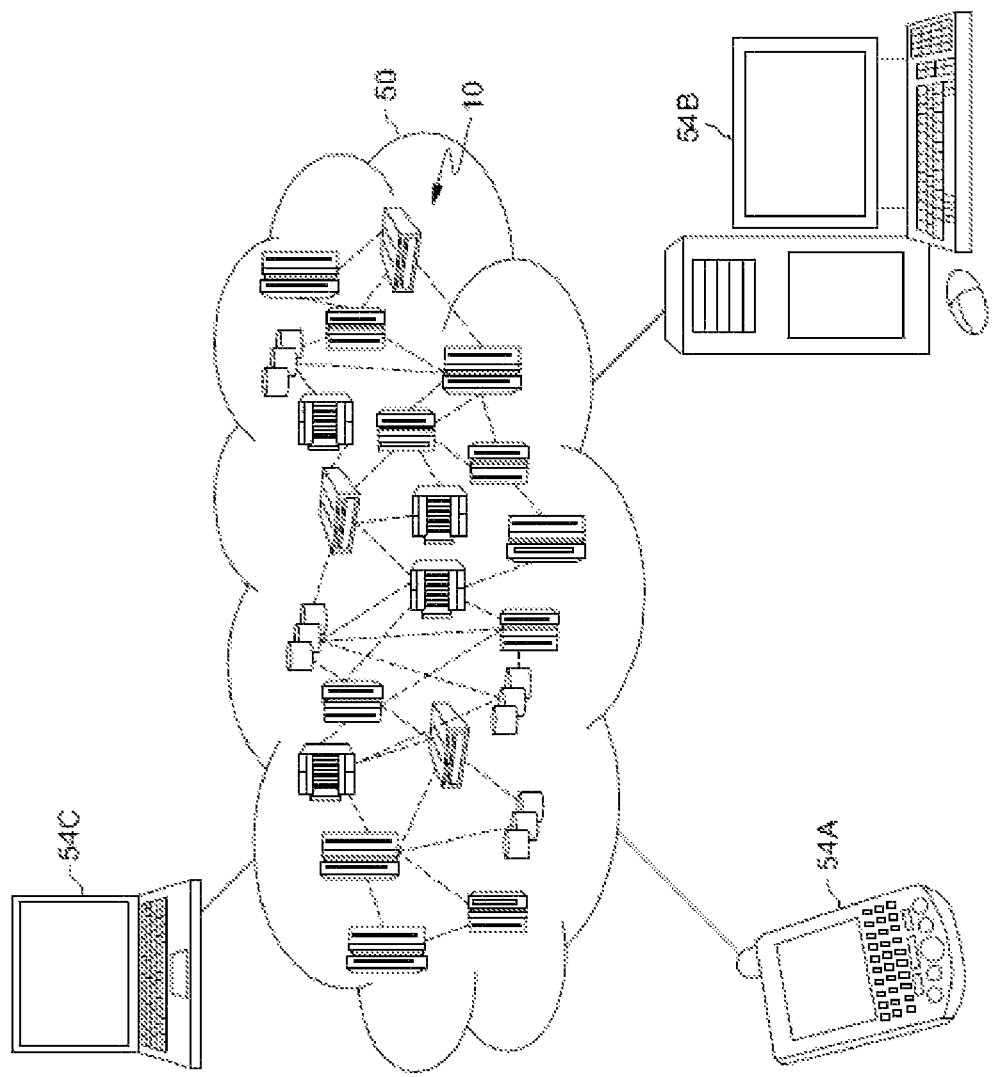
FIG. 8 depicts a cloud computing environment, in accordance with one embodiment of the present invention.

FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-C shown in FIG. 7 are intended to be illustrative only and that computing nodes 10 and cloud computing environment 50 can communicate with any type of computerized device over any type of network and/or network addressable connection (e.g., using a web browser).

Referring back to FIG. 7, the Program/utility 40 may include one or more program modules 42 that generally carry out the functions and/or methodologies of embodiments of the invention as described herein. Specifically, the program modules 42 may analyze a building model, locate the frame members and the furniture, determine the interactions or interfacing between these members and/or furniture, determine if a conflict exists, identify the conflicting members and/or furniture, and provide potential solutions to the conflict and implement the solutions. Other functionalities of the program modules 42 are described further herein such that the program modules 42 are not limited to the functions described above. Moreover, it is noted that some of the modules 42 can be implemented within the infrastructure shown in FIGS. 6-8.

Figure 9:
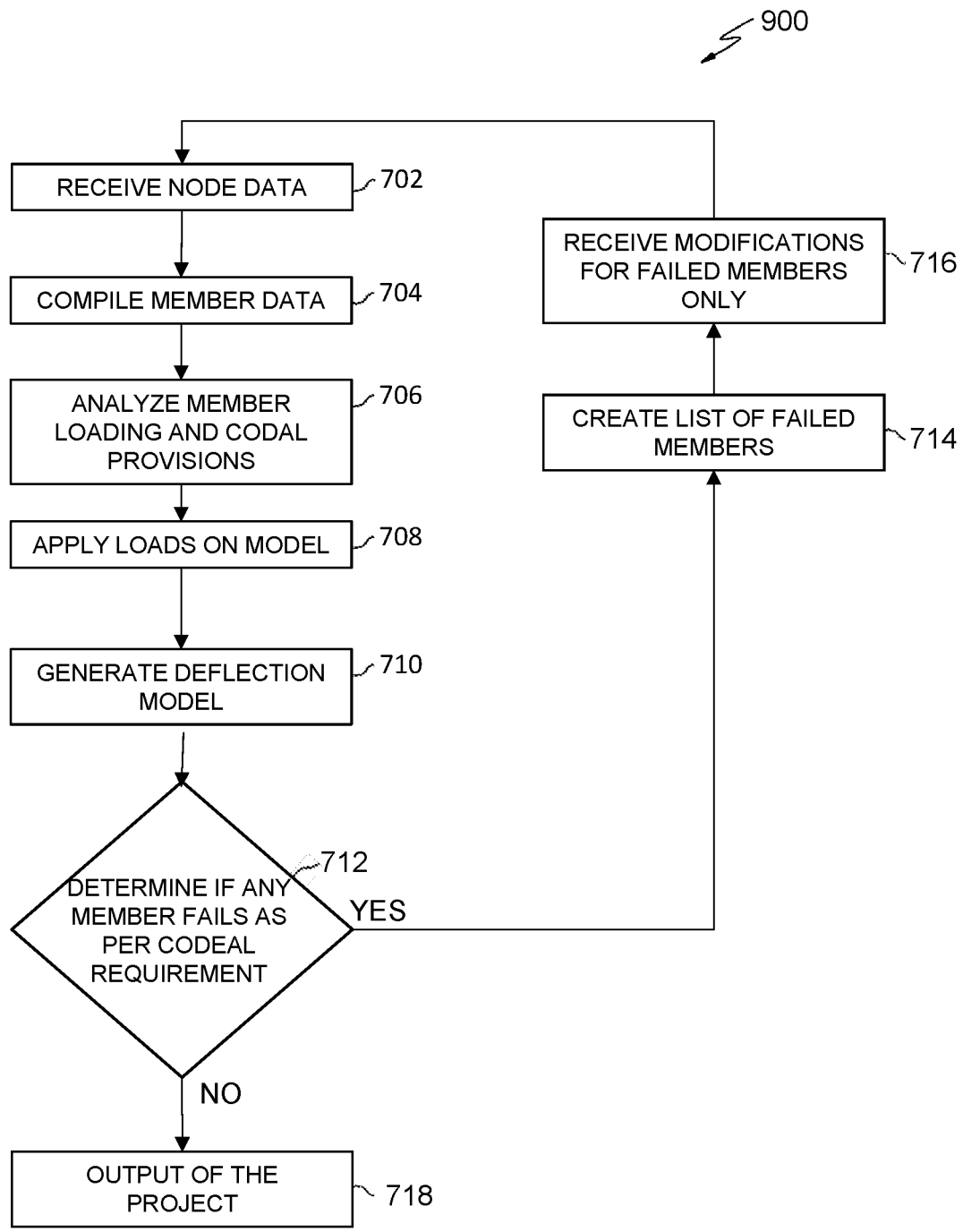
FIG. 9 depicts the flow of operational steps of analyzing and designing the footing within the computer environment of FIG. 6, in accordance with one embodiment of the present invention.

FIG. 9 depicts a flowchart of the operational steps of a method for analysis and design of building within the computing environment of FIG. 6, in accordance with one embodiment of the present invention. The method(s) and associated process(es) are now discussed, throughout the following paragraphs, in accordance with one embodiment of the present invention.

The program(s) described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Program 408 is used to model the structure and analysis, the design, the models, and formation of drawings of the final design. The program 408 through the analysis identifies weaknesses in the form of failed or failing members and areas of overdesign and its cause. The failed members can be further analyzed and design so that it will become safe as per design requirements.

Figure 10:
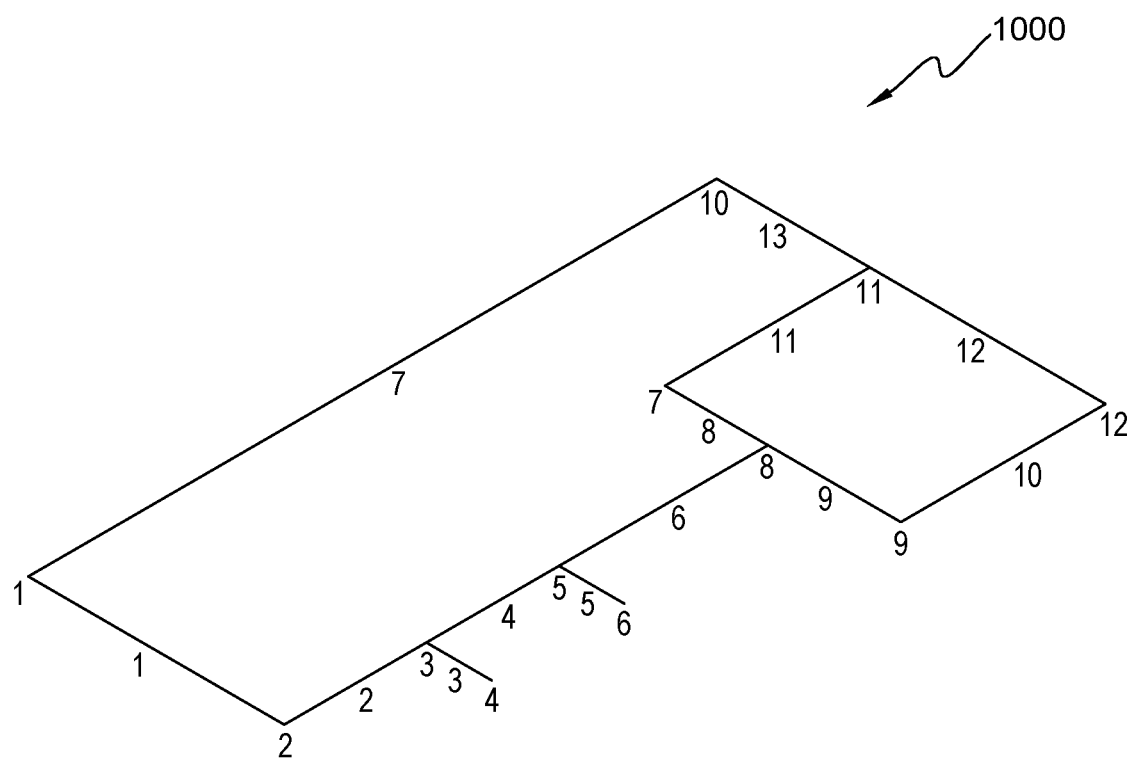
FIG. 10 depicts the graphical output of the program showing details of nodes and members, in accordance with one embodiment of the present invention.

In step 702, the program receives the node data. The node data is related to the building design, the frame, weight (load) and other information about the model. The node data may be jointed and the program creates the members between the joints. As shown in FIG. 10, the foundation floor plan is shown as lines and nodes, wherein each node is given a value. The program knows which nodes to connect based on predetermined foundation structures, or intended design of the foundation. The program may use computer learning or artificial intelligence to determine the best connections between the nodes. In some embodiments, the connection between the nodes follows the structure floor plan or design. The node data may also include such as general information of projects such as Project name, client name, location, design code details, property, soil data, and like which is required for design and analysis. In some embodiments, the nodes are extracted from a 3D model or drawings. In other embodiments, the node data is given through X, Y, Z, coordinates which are then used to create the "floors" or levels of the building including the foundation. Respective load values and soil data as subgrade reaction is provided as a given input. These coordinates are used to model the structure of the building, and more directly the footing.

In step 704, the program compiles the member data based on the received nodal data. The program compiles the distances between the nodes to create the members, this is shown in FIG. 10 where the nodes (numbers 1-10) have lines drawn between them creating the outline of the foundation plan. The members are created to have properties based on the data associated with each node the member interacts with. In some embodiments, the member data is calculated to include data in terms of pound per linear feet. The directly related to the size of the member in terms of both thickness and height.

In step 706, the program analyzes the given input data such as the loading forces on the members, design codes, member lengths, and like. The program starts analyzing the member data and starts formation graphical output of the members to create a 3D model, such as the model shown in FIG. 2. The program then applies (step 708) various loads on the model. These loads are designed to imitate the building, and ground forces which act on the foundation. The loads are applied to the specific sections of the model that would imitate the real-world situation the foundation would be put in. Loads from the building above and the soil around the foundation. These forces are shown in a graphical representation, FIG. 11. The forces 902 are shown as a graphical representation and the supports 904 and 906 are shown based on the contact points of the member ends or the nodes where the forces are applied. In the depicted embodiment, the supports are shown as a visual and based on the value of the load and the force that is applied to the node, the support visual may be adjusted to properly show the different forces.

In step 712, the program analyses the members per the load and design of the member to determine if the member fails. The failure may be in the form of the member "breaking" under the load or failing to meet a specific safety factor. A failed member, may also be a member that is over designed and consumes a greater amount of material than the member needs based on the design.I If any member(s) fail in the design program, a warning is generated or a list is created (step 714) and the members are highlighted in a different color of graphical output showing the location of failed members. The program will also notify the condition of the failure of the member. Then the program calculates potential resolutions to the failed member (step 716). This resolution is in the form of increasing the size of the member (height or thickness, or material), adding in additional members, or the like to either strengthen the member or redistribute the force. This may also include the adjustment or modification of the building above.

Figure 11:
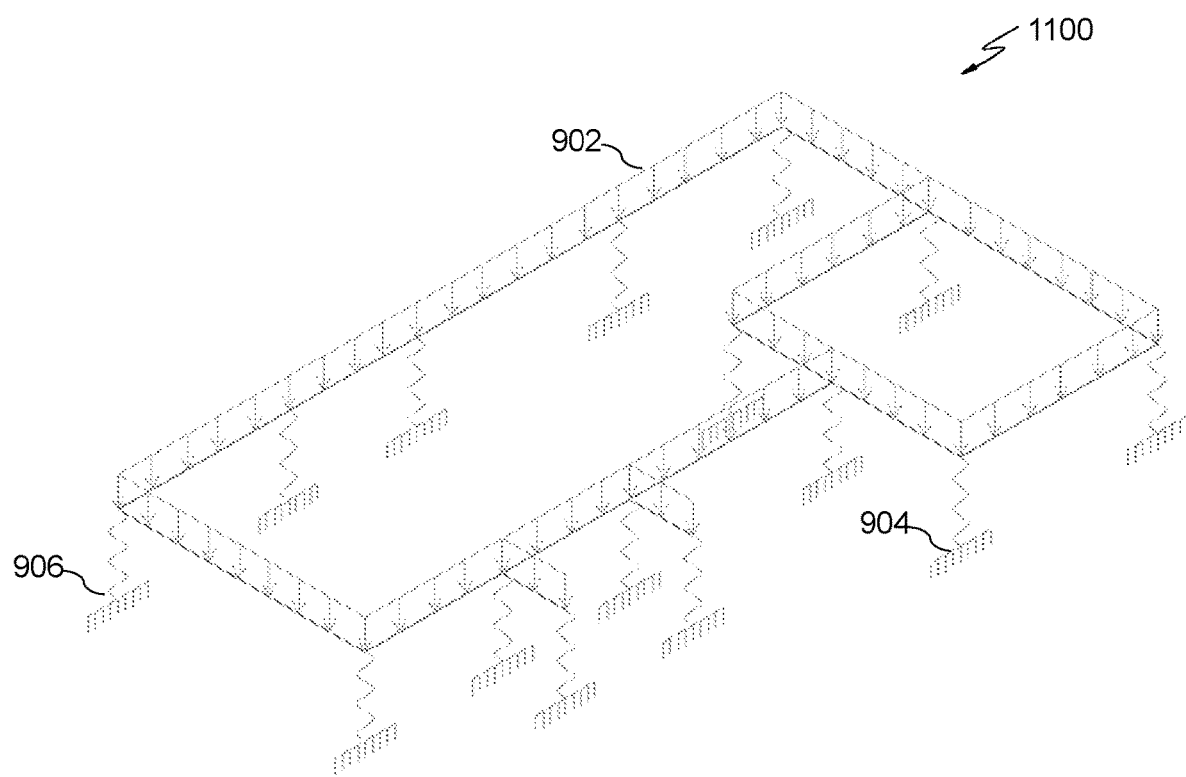
FIG. 11 depicts the graphical output showing the loading diagram of the nodes and members, in accordance with one embodiment of the present invention.

If no member is failing, the program shows the graphical output 1000 of the structure as per the given input. In FIG. 10. The program also develops a graphical output of the 3-D model of the footing which is shown in FIG. 2 of the final model. The program may also provide a loading diagram as a graphical output showing all loads applied to the members and nodes. In this diagram support also shown. This graphical output 1100 is shown in FIG. 11, in which loading the 902 are shown with supports 904 and 906. If the soil specification changes at the site from one point to another point, accordingly the respective supports are identified as different types of supports and shown in different colors. In case there is a condition at the site that at some location soil strength is very low due to the rise in the water table or soil washout due to water, then the program provides the actual ground condition in the software by imputing the value of subgrade reaction of soil. In this case, the footing at this location will be analyzed for the same condition. No need to do extra calculations.

Figure 12:
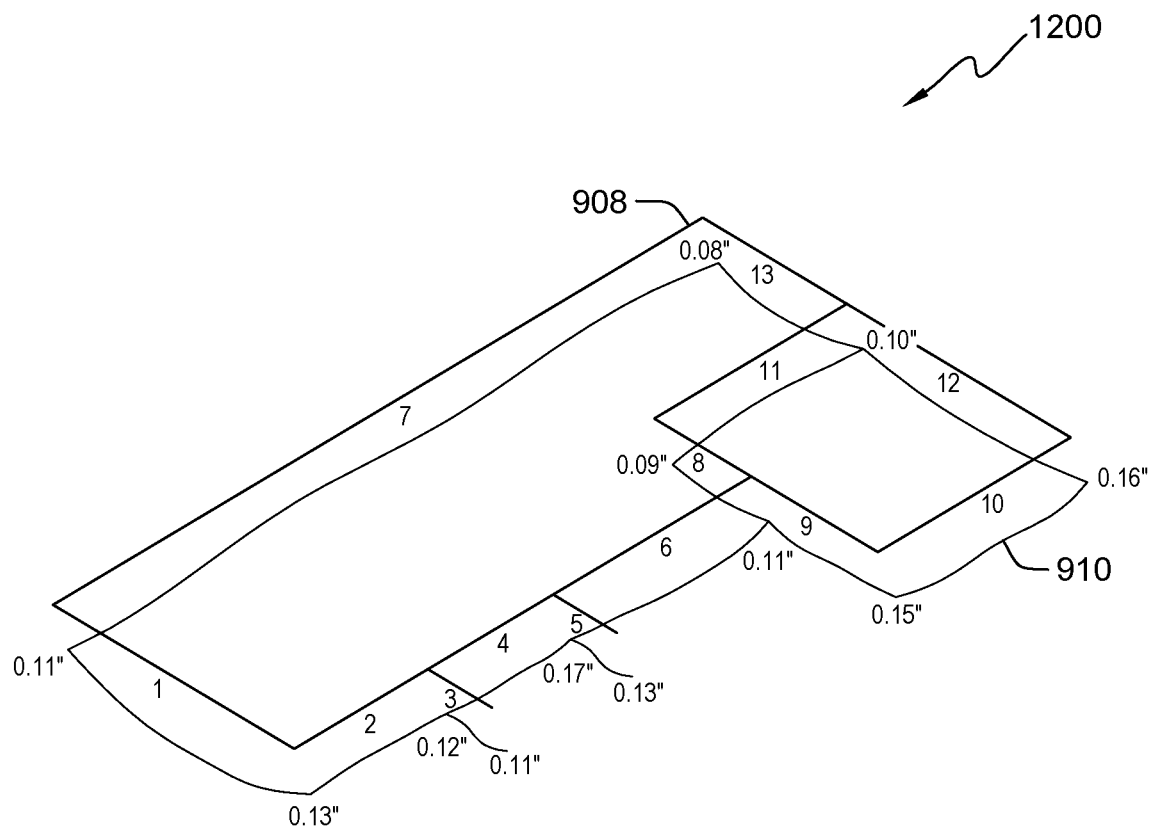
FIG. 12 depicts the graphical output showing the deflection of the node and members, in accordance with one embodiment of the present invention.

After analyzing and designing the whole footing/foundation structure, the program gives deflected shapes as a graphical output 1200 as shown in FIG. 12. The figure shows the foundation members 908 with the deflection 910 of the members superimposed (step 710). This deflection may include the distance of the deflection as shown in the image, this value may transfer to the image 910 where a greater distance would be exaggerated in the image to show where the deflection is greater. This can also be shown in colors, where the highest deflection is in red and the lowest is in blue or green, for example.

Figure 14:
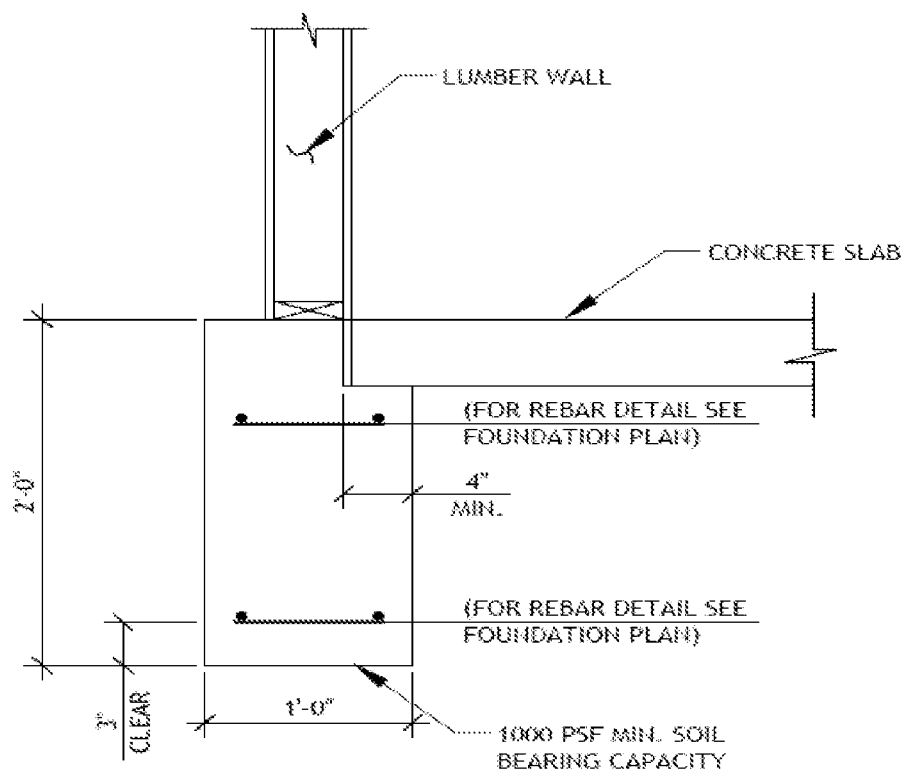
FIG. 14 depicts a section view of a reinforced foundation, in accordance with one embodiment of the present invention.
Figure 15:
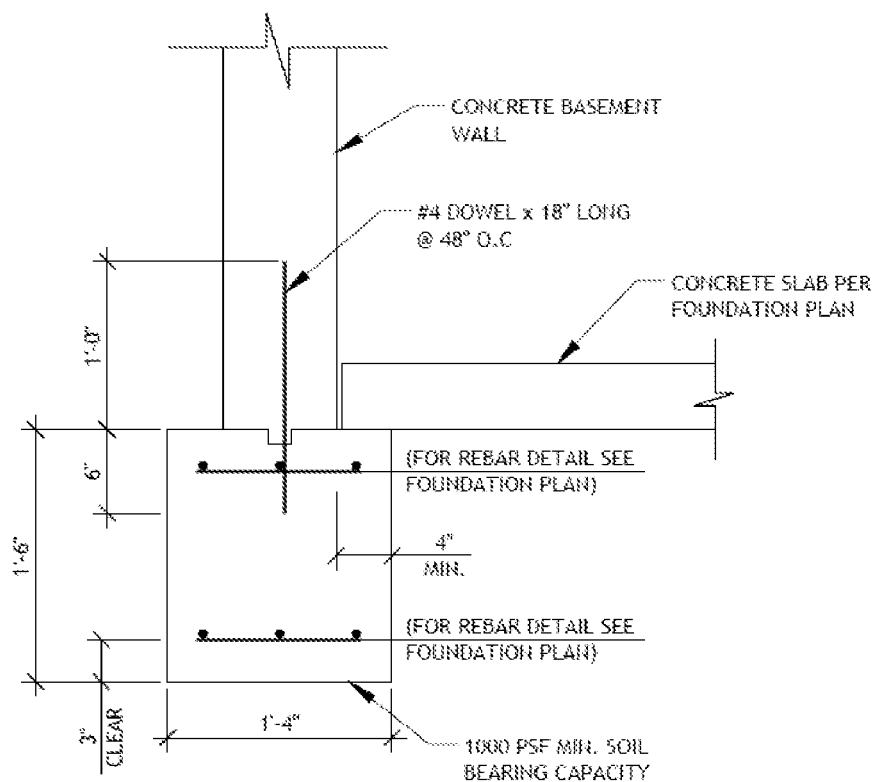
FIG. 15 depicts a section view of a reinforced foundation, in accordance with another embodiment of the present invention.

Once the final design is calculated, the program creates the various views of the foundation to provide all the necessary information. This can include the image shown in FIG. 10 giving top view of the foundation. These views can also include specific architectural views shown in FIGS. 14 and 15 showing specifics of the design and the construction process. In the depicted images rebar is used to reinforce the members. This can be an additional option which the program and use to reinforce the members without using additional material. Various reinforcement members and methods can be used by the program to reinforce the members.

All required output files are generated by the program. These output files include the construction documents, the architectural drawings, and the necessary documents and drawings to acquire the necessary permits and meet the local regulations and requirements. These can also be used to provide limitations on the designs and modifications to the foundation.

In the type of foundation shown in the figures and use as an example, all the members are connected and form a grid frame. Due to these loads coming on the members, they are evenly distributed over all members. At the joints/nodes, the forces from all side are uniformly distributed among all connecting members depending on their capacity and the whole structure become stable. Analysis and design of this type of footing are very simple and straight forward, which reduces further efforts and reduce the time required for analysis and design. This program can be used with other foundation designs and formation, the analysis is likely to be more involved but the program is able to provide the same information and visuals for the user. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer-implemented method for constructing the foundation of a building, comprising:
   receiving nodal data associated with the structure design;
   propagate, by one or more processors, member data of the structural frame;
   analyzing, by one or more processors, the member data of the structural frame and the nodal data;
   applying, by one or more processors, a series of loads to the structural frame;
   generating, by one or more processors, a deflection model of the structural frame;
   determining, by one of more processors, if any of the members failed;
   generating, by one or more processors, a warning related to the failed members, identifying the failed members within a model of the building, and identifying a condition of the failed members; and
   providing, by one or more processors, a strengthening requirements for the failed members.

2. The computer-implemented method of claim 1, further comprising, distributing, by one or more processors, the forces over each frame member.

3. The computer-implemented method of claim 1, further comprising, inserting, by one or more processors, reinforcement members into the failed members.

4. The computer-implemented method of claim 1 further comprising, inserting, by one or more processors, reinforcement members into members of a predetermined length.

5. The computer-implemented method of claim 1, the deflection model, wherein the model shows the varying degree of variation in the deflection of the members.

6. The computer-implemented method of claim 1, establishing, by one or more processors, a footing profile for the foundation.

7. The computer-implemented method of claim 1, further comprising, incorporating, by one or more processors, lateral stiffeners into predetermined members and footing sections.

8. The computer-implemented method of claim 1, wherein the footing and the frame members are individually identified in the structural design.

9. A computer program product for designing a building foundation, the computer program product comprising:
   a non-transitory computer readable storage medium having program instructions embodied therewith, the program instructions executable by a computing device to cause the computing device to:
   program instructions to receive data associated with the structure;
   program instructions to propagate a foundation design based on the structure, wherein the foundation is comprised of a footing and members;
   program instructions to analyze the members and the footing design;
   program instructions to apply a series of loads to the foundation based on the structure design;
   program instructions to generate a deflection model of the structural frame;
   program instructions to identify failing members, wherein the failing members are highlighted in a model of the building and a warning is displayed identifying the failing members;
   program instructions to integrate lateral stiffeners into failed sections of the foundation and
   program instructions to propose modifications to the failing members to overcome the failure.

10. The computer program product of claim 9, wherein the deflection model shows the deflection of each of the members.

11. The computer program product of claim 9, wherein the deflection model shows a superimposed deflection of the members.

12. The computer program product of claim 9 further comprising, program instructions to integrate internal reinforcement members into failed members.

13. The computer program product of claim 9, wherein the deflection model is color coated based on the degree of deflection.

14. A system for designing a building foundation comprising:
- a computer processing unit (CPU), a computer readable memory and a non-transitory computer readable storage medium associated with a computing device;
- program instructions to receive data associated with a structure;
- program instructions to propagate a foundation design based on the structure, wherein the foundation is comprised of a footing and members;
- program instructions to analyze the members and the footing design;
- program instructions to apply a series of loads to the foundation based on the structure design;
- program instructions to generate a deflection model of the structural frame;
- program instructions to identify failing members, and highlighting the failing members within a user interface where a model of the building is displayed; and
- program instructions to formulate modifications to the failing members to overcome the failure.

15. The system of claim 14, further comprising, program instructions to alter the failed members with lateral stiffeners.

16. The system of claim 14, further comprising, program instructions to alter the failed members with internal reinforcement members.

17. The system of claim 14, wherein the deflection model provides a superimposed image of the deflection of the foundation over an original version of the foundation.

18. The system of claim 14, wherein the deflection model identifies the loads applied to each member.

19. The system of claim 14, further comprising, program instruction to form the foundation from a series of nodal points and connection members between the series of nodal points based on a predetermined foundation design.

* * * * *